United States Patent
Vasudevan et al.

(10) Patent No.: US 11,288,720 B1
(45) Date of Patent: Mar. 29, 2022

(54) INVOICE GENERATION RECOMMENDATION

(71) Applicant: International Business Machines Corporation, Armonk, NY (US)

(72) Inventors: Shrihari Vasudevan, Chennai (IN); Sudhanshu Shekhar Singh, New Delhi (IN); Rakesh Rameshrao Pimplikar, Bangalore (IN); Shweta Garg, New Delhi (IN); Gyana Ranjan Parija, Gurgaon (IN); Jasmina Mohorn, Durham, NC (US); Magesh A Narayanan, New Albany, OH (US); Didier Denove, Berlin (DE); Khalid Siddiqui, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/119,118

(22) Filed: Dec. 11, 2020

(51) Int. Cl.
*G06Q 30/04* (2012.01)
*G06N 20/00* (2019.01)
*G06Q 10/10* (2012.01)
*G06Q 20/40* (2012.01)

(52) U.S. Cl.
CPC ............ *G06Q 30/04* (2013.01); *G06N 20/00* (2019.01); *G06Q 10/109* (2013.01); *G06Q 20/4016* (2013.01)

(58) Field of Classification Search
CPC ...... G06N 20/00; G06Q 30/04; G06Q 10/109; G06Q 20/4016
USPC ........................................................ 705/34
See application file for complete search history.

(56) References Cited

U.S. PATENT DOCUMENTS

| | | |
|---|---|---|
| 5,483,445 A | 1/1996 | Pickering |
| 6,044,138 A | 3/2000 | Graham et al. |
| 6,337,901 B1 | 1/2002 | Rome et al. |
| 6,625,267 B1 | 9/2003 | Graham et al. |

(Continued)

FOREIGN PATENT DOCUMENTS

| | | |
|---|---|---|
| CN | 102208092 A | 5/2011 |
| EP | 1461747 A2 | 9/2004 |

(Continued)

OTHER PUBLICATIONS

Automated Electric Bill Generation, 2021 (Year: 2021).*

(Continued)

*Primary Examiner* — Florian M Zeender
*Assistant Examiner* — Nicole Elena Bruner
(74) *Attorney, Agent, or Firm* — Ference & Associates LLC

(57) ABSTRACT

One embodiment provides a computer implemented method, including: receiving billing information related to a billing contract of a customer of a seller, wherein the billing contract identifies amounts of invoices and an invoice frequency; identifying, utilizing one or more artificial intelligence agents, one or more risk factors associated with generation of a pending invoice based upon the billing information; and recommending, utilizing the one or more artificial intelligence agents, a generation date for the pending invoice based upon the one or more risk factors, wherein the recommending includes selecting a generation date to facilitate timely payment of the pending invoice by the customer.

18 Claims, 3 Drawing Sheets

(56) References Cited

U.S. PATENT DOCUMENTS

| | | | |
|---|---|---|---|
| 7,146,332 B2 | 12/2006 | Owen, Jr. | |
| 7,236,950 B2 | 6/2007 | Savage et al. | |
| 7,328,178 B2 | 2/2008 | Matsumoto et al. | |
| 7,346,565 B2 | 3/2008 | Byrne et al. | |
| 7,353,203 B1 | 4/2008 | Kriplani et al. | |
| 8,732,073 B2 | 5/2014 | Thomas | |
| 8,818,875 B2 | 8/2014 | Karnin et al. | |
| 10,497,016 B1* | 12/2019 | McRae | G06Q 30/02 |
| 2006/0015363 A1 | 1/2006 | Allu et al. | |
| 2007/0265962 A1* | 11/2007 | Bowe | G06Q 30/04 |
| | | | 705/40 |
| 2015/0287001 A1* | 10/2015 | Weiss | G06Q 20/26 |
| | | | 705/40 |
| 2018/0040064 A1* | 2/2018 | Grigg | G06N 5/022 |
| 2018/0268487 A1 | 9/2018 | Matthews et al. | |
| 2020/0234349 A1 | 7/2020 | Deshmukh et al. | |
| 2020/0410561 A1* | 12/2020 | Finley | G06Q 30/04 |

FOREIGN PATENT DOCUMENTS

| | | | | |
|---|---|---|---|---|
| EP | 1536389 A1 | 1/2005 | | |
| KR | 100652110 | * 11/2006 | | G06Q 40/02 |
| WO | WO03048899 A2 | 6/2003 | | |

OTHER PUBLICATIONS

John D. Stowe et al., "A Billing Policy for Credit Customers", Managerial and Decision Economics, Oct. 1991, 11 pages, vol. 12, No. 5, Wiley.

\* cited by examiner

INVOICE GENERATION RECOMMENDATION

BACKGROUND

Many entities interact to buy services, products, or the like, from other entities. Some of these transactions are simple transactions, for example, a customer entering a store and buying a product within the store. By the time the customer leaves the store with the purchased product, the transaction has been completed between the customer and the seller with the customer receiving the product and the seller receiving compensation in return. However, a large majority of the transactions that occur are between entities where the seller sends an invoice to the customer for the customer to pay at some point in the future. For example, corporations that have engaged in complex transactions that may include multiple steps or products, a length of time to perform the services, deliver the product, or the like, may receive invoices during different portions of the transaction, upon completion of milestones, upon receiving a particular portion of the product, or the like. These invoices are sent to the customer for the customer to pay within a predetermined time period. Additionally, the seller or an agent of the seller may contact the customer or an agent of the customer to ensure satisfaction with the services, product, or the like.

BRIEF SUMMARY

In summary, one aspect of the invention provides a computer implemented method, including: receiving billing information related to a billing contract of a customer of a seller, wherein the billing contract identifies amounts of invoices and an invoice frequency; identifying, utilizing one or more artificial intelligence agents, one or more risk factors associated with generation of a pending invoice based upon the billing information; and recommending, utilizing the one or more artificial intelligence agents, a generation date for the pending invoice based upon the one or more risk factors, wherein the recommending includes selecting a generation date to facilitate timely payment of the pending invoice by the customer.

Another aspect of the invention provides an apparatus, including: at least one processor; and a computer readable storage medium having computer readable program code embodied therewith and executable by the at least one processor: wherein the computer readable program code is configured to receive billing information related to a billing contract of a customer of a seller, wherein the billing contract identifies amounts of invoices and an invoice frequency; wherein the computer readable program code is configured to identify, utilizing one or more artificial intelligence agents, one or more risk factors associated with generation of a pending invoice based upon the billing information; and wherein the computer readable program code is configured to recommend, utilizing the one or more artificial intelligence agents, a generation date for the pending invoice based upon the one or more risk factors, wherein the recommending includes selecting a generation date to facilitate timely payment of the pending invoice by the customer.

An additional aspect of the invention provides a computer program product, including: a computer readable storage medium having computer readable program code embodied therewith, the computer readable program code executable by a processor: wherein the computer readable program code is configured to receive billing information related to a billing contract of a customer of a seller, wherein the billing contract identifies amounts of invoices and an invoice frequency; wherein the computer readable program code is configured to identify, utilizing one or more artificial intelligence agents, one or more risk factors associated with generation of a pending invoice based upon the billing information; and wherein the computer readable program code is configured to recommend, utilizing the one or more artificial intelligence agents, a generation date for the pending invoice based upon the one or more risk factors, wherein the recommending includes selecting a generation date to facilitate timely payment of the pending invoice by the customer.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
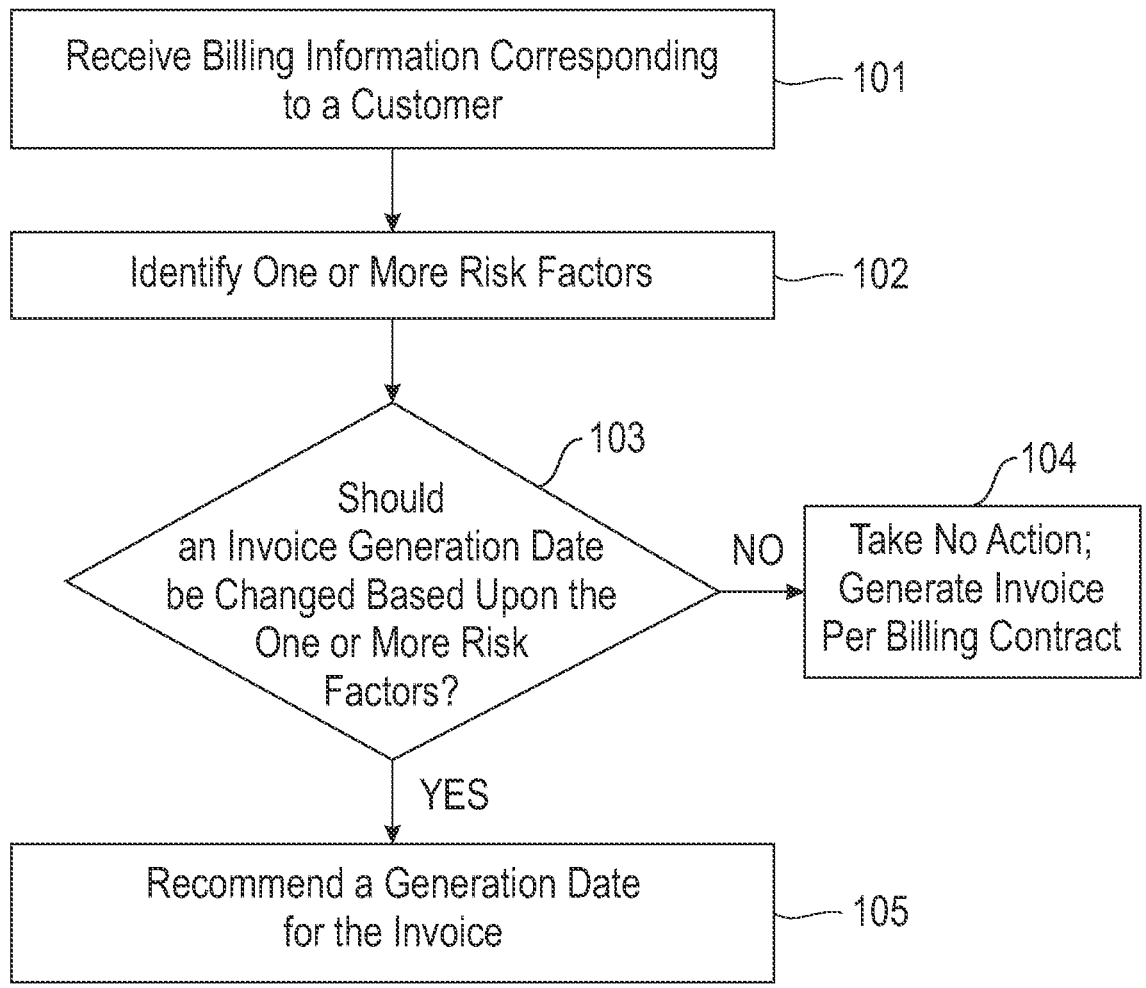
FIG. 1 illustrates a method of providing a recommendation of an invoice generation date for an invoice of a customer based upon one or more risk factors that may impact the invoice approval or payment of the invoice.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

In order to facilitate timely payment of invoices, invoices need to be generated and provided to the customer in a timely fashion. In a situation where a billing contract between a customer and seller delineates invoice amounts and a frequency of invoices, the process may proceed with little manual intervention. However, this relies on no changes to the terms of the billing contract. For example, if the seller does not provide a service or product within a prescribed time period, the customer is not happy with a product or service or disputes a portion of the invoice, only a portion of the product or service is provided, or the like, the invoice amount and/or invoice timing may need to be modified. Generally, any modifications to an invoice require one or more approvals. This invoice approval process may have many steps that can slow the generation of an invoice. Thus, if the invoice is generated at a typical time interval, the invoice may not be provided to the customer in a timely manner which may result in a delayed payment and many other downstream issues.

Other factors may cause issues with either the timeliness of generation of the invoice or payment of the invoice. When one of these factors is present, the invoice generation and/or invoice payment can be delayed from a typical time period. Traditionally, there is no mechanism to identify possible factors that may affect the timeliness of invoice generation and/or invoice payment. Thus, there is traditionally no mechanism for identifying that the invoice generation process should begin earlier than normal in order to facilitate timely payment of a generated invoice. Rather, the traditional techniques are reactive, meaning no steps are taken regarding the invoice generation until after the invoice is generated and it is determined that it was not generated in time to facilitate a timely payment. This results in many downstream issues such as budgeting issues, collection issues, and the like.

Accordingly, an embodiment provides a system and method for providing a recommendation of an invoice generation date for an invoice of a customer based upon one or more risk factors that may impact the invoice approval or payment of the invoice. The system receives billing information related to a billing contract of a customer of a seller. The billing contract identifies amounts of invoices and an invoice frequency. Additionally, the billing contract may identify milestones that are to be reached by the seller for every invoice. For example, the billing contract may identify that the seller must deliver a particular amount of products in order to receive the invoice amount.

One or more artificial intelligence agents may identify one or more risk factors that are associated with generation of a pending invoice for the customer based upon the billing information. The risk factors may include internal risk factors (e.g., risk factors that may affect an invoice approval process, risk factors that are associated with the customer's timely payment of the invoice, etc.) or external risk factors (e.g., natural disasters, market sentiment, transportation issues, customer credit rating and/or credit score changes, etc.). The one or more artificial intelligence agents analyzes the risk factors and, based upon the analysis, recommend a generation date for the pending invoice. The recommended generation date attempts to facilitate timely payment of the pending invoice by the customer. In other words, instead of generating the pending invoice at a typical time period, the one or more artificial intelligence agents may recommend changing the generation date for the pending invoice to account for the one or more identified risk factors in order to facilitate timely payment of the pending invoice by the customer.

Such a system provides a technical improvement over current systems for invoice generation. Instead of reactive techniques as found in the traditional techniques, the described system and method provide a proactive mechanism for recommending invoice generation dates. The proactive mechanism, which utilizes artificial intelligence agents, takes into account any risk factors that are present and that may affect the generation of the invoice and/or payment of the invoice in order to recommend when the invoice generation process should begin to facilitate timely payment of the invoices. By proactively recommending and changing the invoice generation date, the described system and method facilitates timely payment of invoices which reduces the burden on downstream processes and accounts that rely on the timely payments. Accordingly, the described system and method provides a system that is more consistent and facilitates better budgeting than traditional systems.

FIG. 1 illustrates a method for providing a recommendation of an invoice generation date for an invoice of a customer based upon one or more risk factors that may impact the invoice approval or payment of the invoice. At 101 the system receives billing information related to a billing contract of a customer of a seller. The billing contract is a contract between the customer and the seller that delineates the products, services, or the like, that the seller is to furnish to the customer. In exchange, the customer agrees to compensate the seller for the products, services, or the like. Thus, the billing contract identifies amounts or values of invoices to be sent to the customer and also an invoice frequency, for example, monthly, weekly, quarterly, or the like. The billing contract may identify other information, for example, what services, products, or the like, need to be provided to the customer by each invoice frequency, dispute resolution details, a timeliness of payment after receipt of the invoice, and other information. Accordingly, the billing information received by the system may be any relevant information included in the billing contract.

At 102 the system may identify one or more risk factors associated with generation of a pending invoice for the customer. The pending invoice is based upon the billing information. In other words, the pending invoice is based upon the information included in the received billing information. The risk factors may indicate a possibility that the invoice will not be generated in a time frame identified within the billing contract. Additionally, or alternatively, the risk factors may indicate a possibility that the customer will not provide a timely payment to the invoice. In other words, the risk factors may indicate a possibility that the seller will not receive a payment on the invoice within a desired timeframe unless proactive measures are taken to address the risk factors.

To identify the one or more risk factors, the system may utilize one or more artificial intelligence agents to detect possible risk factors. Some risk factors may be internal risk factors, for example, risk factors associated with the seller or customer, or may be external risk factors, for example, risk factors outside the direct control of either the seller or customer. Example external risk factors include market conditions, transportation issues, natural disasters, supply issues, or the like. These risk factors are outside the direct control of the seller or customer but still affect the ability of the invoice to be generated on time, the ability of the customer to pay the invoice in a timely manner, or conditions of fulfillment of the pending invoice.

Example internal risk factors include an indication that the seller invoice approval process will not be completed on time, a payment history, including a timeliness of payments, of the customer, changes in the terms of a pending invoice, and the like. For example, the agents may determine that an invoice approver has more invoices than normal to approve, an invoice approver is on vacation during an approval period, additional approvals are necessary for a pending invoice than normal, or the like. As another example, the agents may determine that based upon a payment history of the customer, the customer is unlikely to make a payment within the prescribed time period, that if the customer receives an invoice after a particular date that the payment will be delayed, or the like. As a final example, the agents may determine that some terms of the billing contract were not met so the invoice amount or frequency needed to be adjusted which may result in additional approvals, thereby delaying the invoice generation.

In the case that more than one artificial intelligence agent is utilizes, each agent may analyze different information sources or risk factor indicators. For example, one agent may analyze external risk factor information, whereas another agent may analyze internal risk factor information. More than two agents may be utilized, so the information sources may be further separated so that each agent can perform an analysis on different information. Alternatively, each agent may be responsible for making a different determination. For example, one agent may be responsible for estimating a delay in the invoice generation, another agent may be responsible for estimating a payment delay, and another agent may be responsible for estimating a risk of change to the invoice.

To make any risk factor information more accessible to the agents the system may store the risk factor information within a data repository that is accessible by any of the agents. The data repository may also store the billing information and/or billing contract information so that it is also accessible to the agents. Thus, any billing information and/or billing contract information that may correspond to one or more risk factors is also accessible to the agent through the data repository. It should be understood that while the term data repository is used, this may actually refer to more than one data repository or data store, with each data repository or data store storing different or redundant information.

The data repository may store information related to historical invoices and payments corresponding to those historical invoices. For example, every time that a change is made to an invoice, the system may log the change within the data store. The agents can then analyze this information to identify the impact the change had on the invoice generation process and/or timeliness of the payment with respect to the generated invoice. For example, if an amount of a historical invoice was changed that required additional approvals, the agent may determine that the additional approval time delayed the invoice generation process by a few days. As another example, an agent may determine that delaying provision of products a few days but within the invoice period caused the customer to dispute the invoice, thereby delaying the timeliness of the payment. In other words, the agents can make correlations between invoice changes and impacts on invoice generation and/or invoice payments. These correlations can be used by the agents to identify whether a change to an invoice should be considered a risk factor.

At 103 the system may determine if an invoice generation date should be changed based upon the one or more risk factors. The one or more artificial intelligence agents may be used to make the determination regarding whether the invoice generation date should be changed. To make this determination the agents may analyze any risk factors that are present with the current pending invoice and determine if they are likely to affect the invoice generation and/or timeliness of payments. In determining whether the risk factors may impact the invoice generation and/or timeliness of payments, different risk factors may be weighted. Additionally, or alternatively, a number of risk factors may be taken into account. For example, a certain number of risk factors must be present in order to designate a likeliness of impact. As another example, the system may calculate a probability of impact and, if that probability meets or exceeds a threshold, then the agents identify that an impact is likely. Other techniques for identifying an impact are possible. Additionally, a combination of techniques may be utilized.

If the system determines that the invoice generation date should not be changed at 103, the system may take no action at 104. Additionally, or alternatively, the system may generate the invoice per the billing contract or in the typical fashion. The system may determine that the invoice generation date should not be changed due to the fact that no risk factors are present, that the risk factors that are present do not impact the invoice generation and/or payment timeliness, or the like.

On the other hand, if the system determines that the invoice generation date should be changed at 103, the system may recommend a generation date for the pending invoice based upon the one or more risk factors at 105. In recommending a generation date the system, via the one or more artificial intelligence agents, may select a generation date that reduces the impact of any of the risk factors. In other words, the system may select a generation date to facilitate timely payment of the pending invoice by the customer whether that is by making sure that the invoice is generated on time or that the customer is likely to make a payment upon receiving the invoice.

To recommend a generation date, the agents may calculate a time-based impact of the one or more risk factors for generating the invoice and a time for payment of the invoice. In other words, the agents may determine how much of a time impact the one or more risk factors will be on either or both of the invoice generation and the timeliness of the payment of the invoice. In making the time impact determination, the system may utilize time correlations between historical invoices and risk factors. In other words, the system may determine a historical time impact of particular risk factors and based upon the presence of those same risk factors, the system may make an estimate of the time impact on the pending invoice.

The generation date recommendation may occur before the invoice is generated for the customer. In other words, rather than in conventional techniques that are reactive and unable to account for any possible issues with invoice generation and/or timeliness of payments, the described system provides an invoice generation date recommendation before the invoice is generated and provided to the seller, thereby making this system a proactive system. Accordingly, the presence of the one or more risk factors may act as a trigger event to make a generation date recommendation. Other trigger events are possible and contemplated and the examples included herein are not intended to be limiting. Thus, identifying the risk factors and making the recommendation may occur before the invoice is even generated.

After an invoice is generated, the system may receive performance metrics regarding the performance of the one or more artificial intelligence agents. In other words, the system determines if the recommendation made by the agents was useful, accurate, and/or helpful. For example, if the agents recommend moving the invoice generation up by a couple of days but, in response, an invoice approver delays approval of the invoice by a couple of days, the system may determine the recommendation was not useful. As another example, if the agents recommend delaying the invoice generation by a couple of days but, in response, the customers delay payment of the invoice by a month, the system may determine the recommendation was not helpful. As a contrasting example, if the agents recommend moving the invoice generation date and, in response, the invoice is generated on time and the payment is made in a timely fashion, the system may determine the recommendation was a good recommendation. These performance metrics can be provided back to the agent system as feedback in order to update the agents and make them more accurate or useful.

Figure 2:
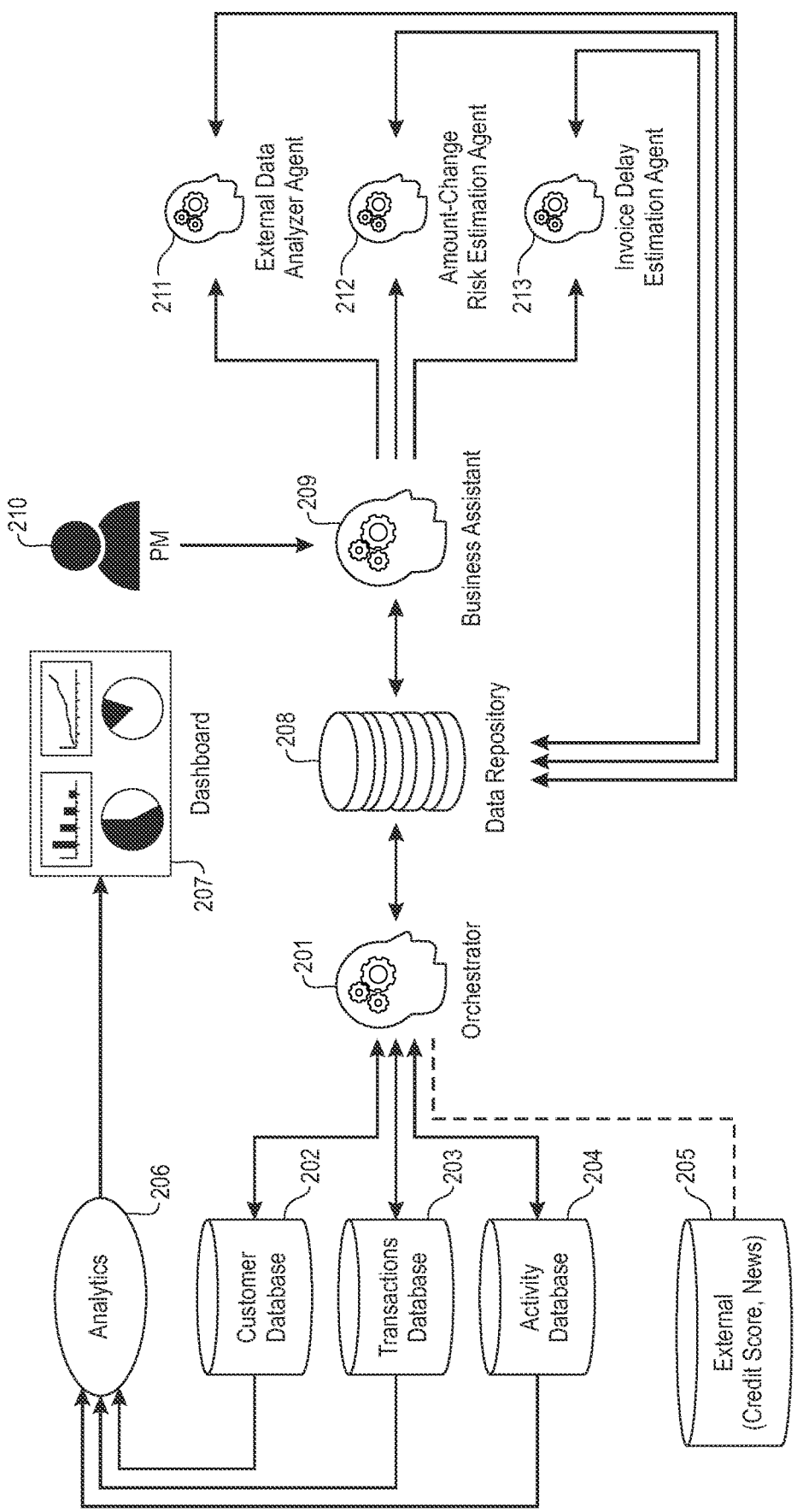
FIG. 2 illustrates an overall system architecture for providing a recommendation of an invoice generation date for an invoice of a customer based upon one or more risk factors that may impact the invoice approval or payment of the invoice.

FIG. 2 illustrates an example overall system architecture of the described system. An orchestrator agent 201 receives billing information and risk factor information from one or more sources, for example, a customer database 202, transactions database 203, activity database 204, external factors (e.g., credit score, news stories, market sentiment, etc.) 205, or the like. The risk factor information may be provided to an analytics system 206 and may be presented on a graphical user interface in the form of a dashboard 207. The orchestrator agent 201 may provide the billing information and risk factor information to a data repository 208. A business assistant agent 209 can access the data repository and provide an interface to a human agent, for example, a project manager (PM) 210. The business assistant agent 209 can also interface with the one or more artificial intelligence agents, for example, an external data analyzer agent 211, an amount-change risk estimation agent 212, an invoice delay estimation agent 213, or the like. These agents 211, 212, and 213, make estimations regarding using the information included in the data repository 208.

Figure 3:
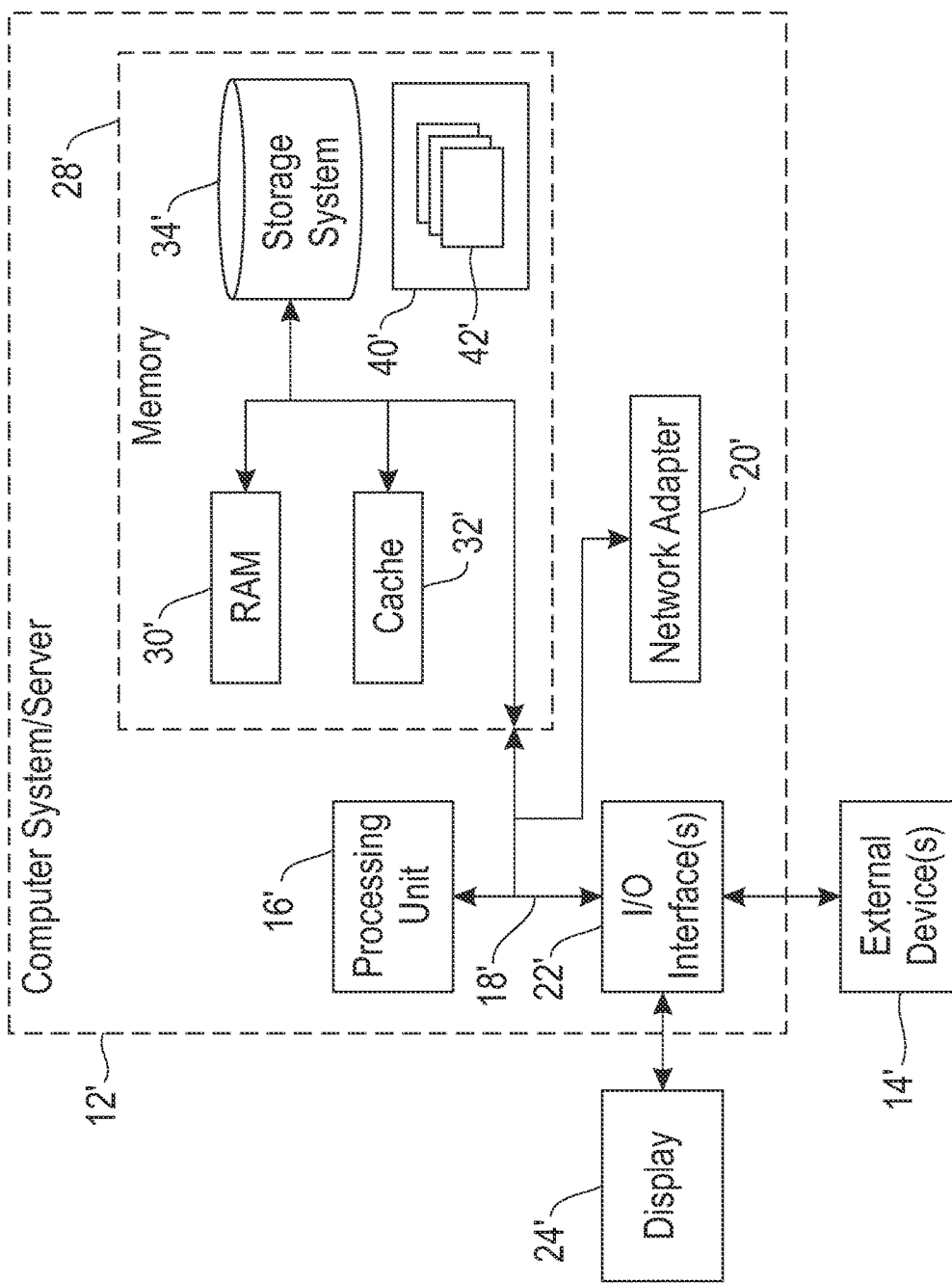
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
   receiving, at an invoicing system, billing information related to a billing contract of a customer of a seller, wherein the billing contract identifies amounts of invoices and an invoice frequency;
   identifying, utilizing a plurality of artificial intelligence agents of the invoicing system, one or more risk factors associated with generation of a pending invoice based upon the billing information, wherein each of the plurality of artificial intelligence agents analyzes different risk factor indicators, wherein at least one of the plurality of artificial intelligence agents accesses historical invoices and corresponding payments, identifies changes made to the historical invoices, and identifies an impact each of the changes has on the invoice process and payment, wherein the at least one of the plurality of artificial intelligence agents identifies a correlation between each of the changes and the impact on the invoice process and payment and designates the changes as risk factors;
   recommending, utilizing the plurality of artificial intelligence agents of the invoicing system, a generation date for the pending invoice based upon the one or more risk factors, wherein the recommending comprises selecting a generation date to facilitate timely payment of the pending invoice by the customer, wherein the recommending a generation date comprises weighting the one or more risk factors based upon a likeliness of impact identified from the correlations;
   receiving, at the invoicing system, performance metrics corresponding to the plurality of artificial intelligence agents, wherein the performance metrics designate an accuracy of the recommended generation date made by the plurality of artificial intelligence agents; and
   updating, using the invoicing system, the plurality of artificial intelligence agents by feeding, using the invoicing system, the performance metrics to the plurality of artificial intelligence agents.

2. The computer implemented method of claim 1, wherein the one or more risk factors is associated with an invoice generation process of the seller.

3. The computer implemented method of claim 1, wherein the one or more risk factors is associated with an ability of the customer to pay the invoice.

4. The computer implemented method of claim 1, wherein the one or more risk factors comprises a change in a pending invoice.

5. The computer implemented method of claim 1, wherein the identifying one or more risk factors comprises accessing a data store.

6. The computer implemented method of claim 1, wherein the one or more risk factors comprises at least one of: internal risk factors and external risk factors.

7. The computer implemented method of claim 1, wherein the recommending comprises calculating a time-based impact of the one or more risk factors on one of: a time for generating the invoice by the seller and a time for payment of the invoice by the customer.

8. The computer implemented method of claim 1, wherein the billing contract and information corresponding to the one or more risk factors are stored within a data repository accessible by the plurality of artificial intelligence agents.

9. The computer implemented method of claim 1, wherein the identifying and recommending occurs before the invoice is generated.

10. An apparatus, comprising:
    at least one processor; and
    a computer readable storage medium having computer readable program code embodied therewith and executable by the at least one processor:
    wherein the computer readable program code is configured to receive, at an invoicing system, billing information related to a billing contract of a customer of a seller, wherein the billing contract identifies amounts of invoices and an invoice frequency;
    wherein the computer readable program code is configured to identify, utilizing a plurality of artificial intelligence agents, one or more risk factors associated with generation of a pending invoice based upon the billing information, wherein each of the plurality of artificial intelligence agents analyzes different risk factor indicators, wherein at least one of the plurality of artificial intelligence agents accesses historical invoices and corresponding payments, identifies changes made to the historical invoices, and identifies an impact each of the changes has on the invoice process and payment, wherein the at least one of the plurality of artificial intelligence agents identifies a correlation between each of the changes and the impact on the invoice process and payment and designates the changes as risk factors;
    wherein the computer readable program code is configured to recommend, utilizing the plurality of artificial intelligence agents of the invoicing system, a generation date for the pending invoice based upon the one or more risk factors, wherein the recommending comprises selecting a generation date to facilitate timely payment of the pending invoice by the customer, wherein the recommending a generation date comprises weighting the one or more risk factors based upon a likeliness of impact identified from the correlations;
    wherein the computer readable program code is configured to receive, at the invoicing system, performance metrics corresponding to the plurality of artificial intelligence agents, wherein the performance metrics designate an accuracy of the recommended generation date made by the plurality of artificial intelligence agents; and
    wherein the computer readable program code is configured to update, using the invoicing system, the plurality of artificial intelligence agents by feeding, using the invoicing system, the performance metrics to the plurality of artificial intelligence agents.

11. A computer program product, comprising:

a computer readable storage medium having computer readable program code embodied therewith, the computer readable program code executable by a processor:

wherein the computer readable program code is configured to receive, at an invoicing system, billing information related to a billing contract of a customer of a seller, wherein the billing contract identifies amounts of invoices and an invoice frequency;

wherein the computer readable program code is configured to identify, utilizing a plurality of artificial intelligence agents, one or more risk factors associated with generation of a pending invoice based upon the billing information, wherein each of the plurality of artificial intelligence agents analyzes different risk factor indicators, wherein at least one of the plurality of artificial intelligence agents accesses historical invoices and corresponding payments, identifies changes made to the historical invoices, and identifies an impact each of the changes has on the invoice process and payment, wherein the at least one of the plurality of artificial intelligence agents identifies a correlation between each of the changes and the impact on the invoice process and payment and designates the changes as risk factors;

wherein the computer readable program code is configured to recommend, utilizing the plurality of artificial intelligence agents of the invoicing system, a generation date for the pending invoice based upon the one or more risk factors, wherein the recommending comprises selecting a generation date to facilitate timely payment of the pending invoice by the customer, wherein the recommending a generation date comprises weighting the one or more risk factors based upon a likeliness of impact identified from the correlations;

wherein the computer readable program code is configured to receive, at the invoicing system, performance metrics corresponding to the plurality of artificial intelligence agents, wherein the performance metrics designate an accuracy of the recommended generation date made by the plurality of artificial intelligence agents; and wherein the computer readable program code is configured to update, using the invoicing system, the plurality of artificial intelligence agents by feeding, using the invoicing system, the performance metrics to the plurality of artificial intelligence agents.

12. The computer program product of claim 11, wherein the one or more risk factors is associated with an invoice generation process of the seller.

13. The computer program product of claim 11, wherein the one or more risk factors is associated with an ability of the customer to pay the invoice.

14. The computer program product of claim 11, wherein the one or more risk factors comprises a change in a pending invoice.

15. The computer program product of claim 11, wherein the identifying one or more risk factors comprises accessing a data store.

16. The computer program product of claim 11, wherein the recommending comprises calculating a time-based impact of the one or more risk factors on one of: a time for generating the invoice by the seller and a time for payment of the invoice by the customer.

17. The computer program product of claim 11, wherein the billing contract and information corresponding to the one or more risk factors are stored within a data repository accessible by the plurality of artificial intelligence agents.

18. The computer program product of claim 11, wherein the identifying and recommending occurs before the invoice is generated.

* * * * *